(12) United States Patent
Bryan

(10) Patent No.: US 12,626,154 B2
(45) Date of Patent: May 12, 2026

(54) APPARATUS AND A METHOD FOR THE GENERATION OF A JUDGMENT SCORE

(71) Applicant: Bruce Bryan, Queens, NY (US)

(72) Inventor: Bruce Bryan, Queens, NY (US)

( * ) Notice: Subject to any disclaimer, the term of this patent is extended or adjusted under 35 U.S.C. 154(b) by 29 days.

(21) Appl. No.: 18/375,707

(22) Filed: Oct. 2, 2023

(65) Prior Publication Data

US 2025/0111247 A1    Apr. 3, 2025

(51) Int. Cl.
*G06N 5/022* (2023.01)
*G06Q 50/18* (2012.01)

(52) U.S. Cl.
CPC ............. *G06N 5/022* (2013.01); *G06Q 50/18* (2013.01)

(58) Field of Classification Search
None
See application file for complete search history.

(56) References Cited

U.S. PATENT DOCUMENTS

| | | | | |
|---|---|---|---|---|
| 11,010,848 | B1 * | 5/2021 | Colucci | G06Q 50/182 |
| 11,030,516 | B1 * | 6/2021 | Klein | G06N 3/042 |
| 2002/0143562 | A1 * | 10/2002 | Lawrence | G06Q 50/18 |
| | | | | 705/311 |
| 2011/0178936 | A1 * | 7/2011 | Mohan | G06Q 10/10 |
| | | | | 705/311 |
| 2011/0270881 | A1 * | 11/2011 | Borton | G06Q 10/06 |
| | | | | 707/769 |

| | | | | |
|---|---|---|---|---|
| 2012/0323824 | A1 * | 12/2012 | Gansner | G06Q 50/18 |
| | | | | 706/11 |
| 2013/0090954 | A1 * | 4/2013 | Harding | G06Q 40/08 |
| | | | | 705/4 |
| 2013/0198090 | A1 * | 8/2013 | Singh | G06Q 10/10 |
| | | | | 705/309 |

(Continued)

FOREIGN PATENT DOCUMENTS

| | | |
|---|---|---|
| CN | 110634088 A | 12/2019 |
| CN | 112561219 A | 3/2021 |
| CN | 107918921 B | 10/2021 |

OTHER PUBLICATIONS

Ma, Luyao, et al. "Legal judgment prediction with multi-stage case representation learning in the real court setting." 2021, Proceedings of the 44th International ACM SIGIR Conference on Research and Development in Information Retrieval, pp. 1-10 (Year: 2021).*

(Continued)

*Primary Examiner* — Sarah M Monfeldt
*Assistant Examiner* — Michael J. Monaghan
(74) *Attorney, Agent, or Firm* — CALDWELL LLC

(57) ABSTRACT

An apparatus for the generation of a judgment score is disclosed. The apparatus includes at least a processor and a memory communicatively connected to the at least a processor. The memory instructs the processor to receive a plurality of judgment data from a user. The memory instructs the processor to identify a plurality of correction data as a function of the plurality of judgment data. The memory instructs the processor to generate one or more correction factors as a function of the plurality of correction data. The memory instructs the processor to identify a case group as a function of the one or more correction factors. The memory instructs the processor to generate a judgment score as a function of the case group.

18 Claims, 8 Drawing Sheets

(56) References Cited

U.S. PATENT DOCUMENTS

| | | | | |
|---|---|---|---|---|
| 2013/0297540 | A1* | 11/2013 | Hickok | G06Q 10/04 |
| | | | | 706/21 |
| 2014/0344172 | A1* | 11/2014 | Ansari | G06Q 50/01 |
| | | | | 705/311 |
| 2015/0262318 | A1* | 9/2015 | Unwin | G06Q 10/0639 |
| | | | | 705/311 |
| 2015/0310128 | A1* | 10/2015 | Brav | G06F 16/9024 |
| | | | | 707/800 |
| 2016/0086123 | A1* | 3/2016 | Castro | G06Q 50/26 |
| | | | | 705/7.39 |
| 2016/0140210 | A1* | 5/2016 | Pendyala | G06F 40/205 |
| | | | | 707/737 |
| 2016/0239559 | A1* | 8/2016 | Morimoto | G06F 16/243 |
| 2016/0307276 | A1* | 10/2016 | Young | G06Q 40/02 |
| 2016/0314146 | A1* | 10/2016 | Carothers | G06F 16/38 |
| 2017/0330058 | A1* | 11/2017 | Silberman | G06N 20/00 |
| 2017/0364827 | A1* | 12/2017 | Conrad | G06F 16/93 |
| 2018/0082389 | A1* | 3/2018 | Guggilla | G06N 20/00 |
| 2018/0232358 | A1* | 8/2018 | Badenes | G06F 40/30 |
| 2018/0365314 | A1* | 12/2018 | Hu | G06F 16/313 |
| 2019/0043070 | A1* | 2/2019 | Merrill | G06Q 30/0205 |
| 2019/0171936 | A1* | 6/2019 | Karras | G06N 3/084 |
| 2019/0236346 | A1* | 8/2019 | Barone | G06F 16/313 |
| 2019/0238708 | A1* | 8/2019 | Kozlovsky | G06F 16/93 |
| 2019/0286898 | A1* | 9/2019 | Powell | G06F 16/22 |
| 2019/0295199 | A1* | 9/2019 | O'Dorisio | G06Q 50/18 |
| 2019/0354855 | A1* | 11/2019 | Kim | G06N 3/08 |
| 2020/0160184 | A1* | 5/2020 | Kursun | G06N 3/082 |
| 2020/0210840 | A1* | 7/2020 | Darvish Rouhani | G06N 3/082 |
| 2020/0342221 | A1* | 10/2020 | Sampath | G06V 30/412 |
| 2021/0374582 | A1* | 12/2021 | Tristan | G06N 20/10 |
| 2022/0067076 | A1* | 3/2022 | Ghosh | G06Q 50/18 |
| 2022/0138572 | A1* | 5/2022 | Song | G06F 9/4881 |
| | | | | 706/20 |
| 2022/0156862 | A1* | 5/2022 | Rabinowitz | G06F 40/30 |
| 2022/0270046 | A1* | 8/2022 | Burge | G06N 20/00 |
| 2023/0072297 | A1* | 3/2023 | Lakshminarayanan | |
| | | | | G06N 20/00 |
| 2023/0419038 | A1* | 12/2023 | Mahari | G06F 40/56 |
| 2024/0221405 | A1* | 7/2024 | Wells | G06V 10/993 |

OTHER PUBLICATIONS

J. Mitchell, S. Mitchell and C. Mitchell, "Machine learning for determining accurate outcomes in criminal trials," in Law, Probability and Risk, vol. 19, No. 1, pp. 43-65, Apr. 2020, https://ieeexplore.ieee.org/document/9254202.

* cited by examiner

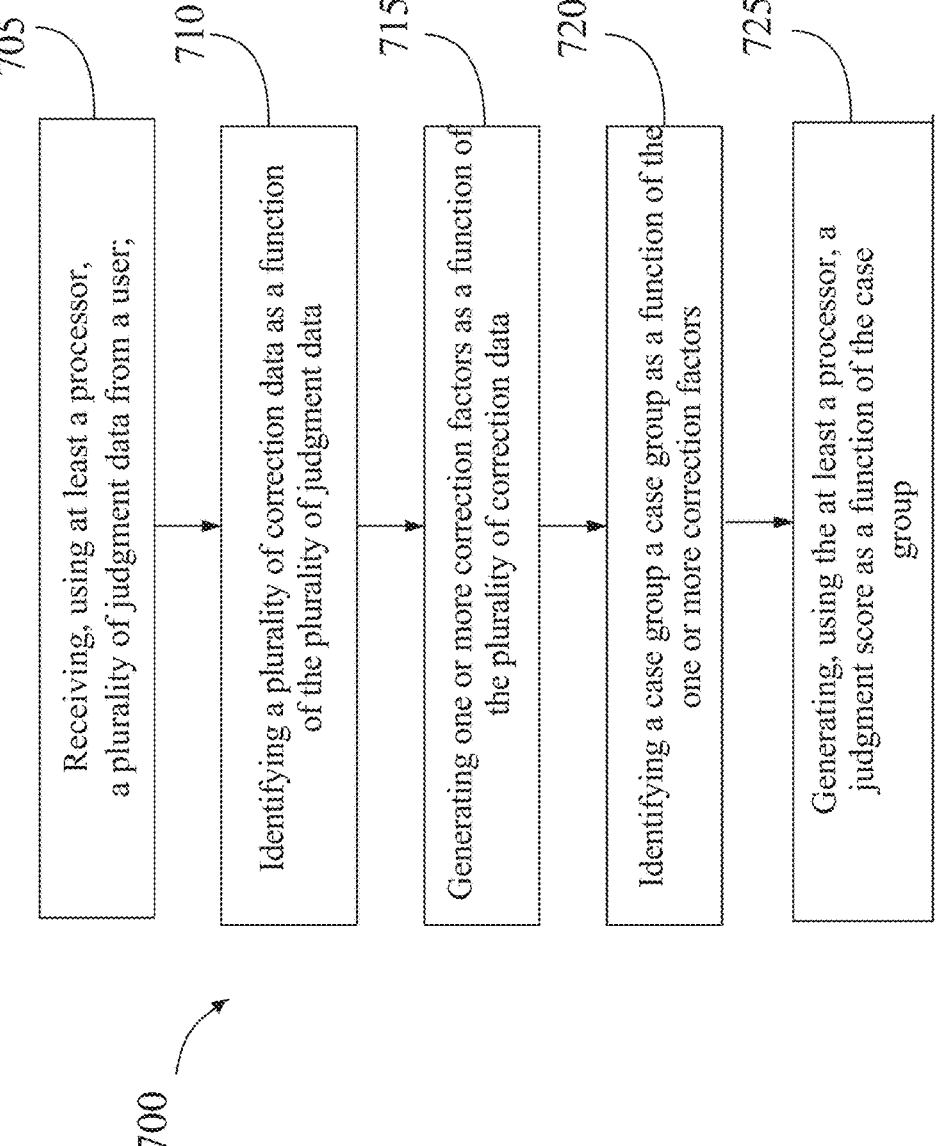

705

Receiving, using at least a processor, a plurality of judgment data from a user;

710

Identifying a plurality of correction data as a function of the plurality of judgment data

715

Generating one or more correction factors as a function of the plurality of correction data

720

Identifying a case group a case group as a function of the one or more correction factors

725

Generating, using the at least a processor, a judgment score as a function of the case group

APPARATUS AND A METHOD FOR THE GENERATION OF A JUDGMENT SCORE

FIELD OF THE INVENTION

The present invention generally relates to the field of data analysis. In particular, the present invention is directed to an apparatus and a method for the generation of a judgment score.

BACKGROUND

Identifying problematic or unreliable data in a dataset can be a challenge, particularly when the problematic data patterns are unknown. Furthermore, the use of data regarding outcomes related to the dataset to find problematic data patterns has not been satisfactorily investigated. Finally, a method for identifying instances of the problematic or unreliable data patterns within a large body of data and notifying stakeholders if an instance is detected is needed.

SUMMARY OF THE DISCLOSURE

In an aspect, an apparatus for the generation of a judgment score is disclosed. The apparatus includes at least a processor and a memory communicatively connected to the at least a processor. The memory instructs the processor to receive a plurality of judgment data from a user. The memory instructs the processor to identify a plurality of correction data as a function of the plurality of judgment data. The memory instructs the processor to generate one or more correction factors as a function of the plurality of correction data. The memory instructs the processor to identify a case group as a function of the one or more correction factors. The memory instructs the processor to generate a judgment score as a function of the case group.

In another aspect, a method for the generation of a judgment score is disclosed. The method includes receiving, using at least a processor, a plurality of judgment data from a user. The method includes generating, using the at least a processor, one or more correction factors as a function of the plurality of correction data. The method includes identifying, using the at least a processor, a case group as a function of the one or more correction factors. The method includes generating, using the at least a processor, a judgment score as a function of the case group.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is a flow diagram of an exemplary method for the generation of a judgment score.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for the generation of a judgment score is disclosed. The apparatus includes at least a processor and a memory communicatively connected to the at least a processor. The memory instructs the processor to receive a plurality of judgment data from a user. The memory instructs the processor to identify a plurality of correction data as a function of the plurality of judgment data. The memory instructs the processor to generate one or more correction factors as a function of the plurality of correction data. The memory instructs the processor to identify a case group as a function of the one or more correction factors. The memory instructs the processor to generate a judgment score as a function of the case group. Exemplary embodiments illustrating aspects of the present disclosure are described below in the context of several specific examples.

Figure 1:
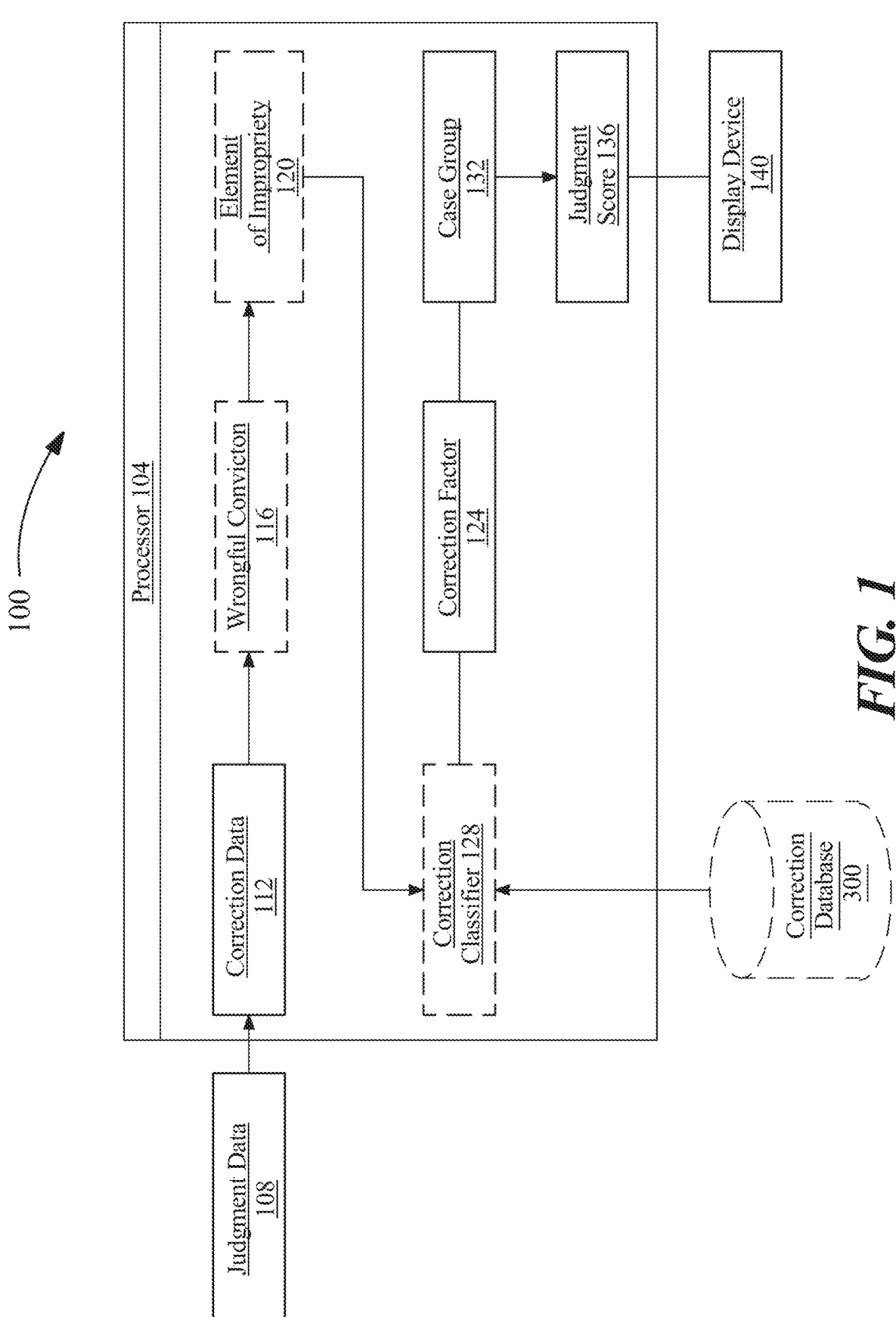
FIG. 1 is a block diagram of an exemplary embodiment of an apparatus for the generation of a judgment score.

Referring now to FIG. 1, an exemplary embodiment of an apparatus 100 for the generation of a judgment score is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. The memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 may be configured to receive a plurality of judgment data 108. As used in the current disclosure, "judgment data" is data regarding past judgements or cases of a court. In some embodiments, the court may be a criminal court. Judgment data 108 may refer to a collection of information related to past judgments and cases that have been processed and resolved within the legal system. Judgment data 108 may include sentencing records, evidentiary information, statements, video surveillance, case records, court records, judicial opinions, and the like. Judgment data 108 may include documents relating to the judgments or cases; for example, motions, deposition records, court records, judicial decisions, complaints, and the like. The judgment data 108 may include the final verdict of the court, which can be "guilty," "not guilty" or the like. If the defendant is found guilty, the data may also contain details of the sentence imposed, such as fines, probation, community service, or incarceration. Judgment data 108 may additionally include information regarding the type of crime the defendant in charged with. This may include information regarding the specific statue, law, or criminal code that the defendant was charged with. In an embodiment, judgment data 108 may be received from a database. This may include a judicial database, criminal database, public records, and the like. The judgment data 108 may include a chronological account of the legal process, from the initial arraignment to the final verdict and sentencing. It may also include information about pre-trial motions, plea bargains, and appeals if applicable. In an embodiment, judgment data 108 may include various statistical information, such as the frequency of specific crimes, conviction rates, sentencing patterns, and the duration of different stages in the legal process.

With continued reference to FIG. 1, processor 104 may be configured to generate judgment data 108 using an application programming interface (API). As used herein, an "application programming interface" is a set of functions that allow applications to access data and interact with external software components, operating systems, or microdevices, such as another web application or computing device. An API may gather a large dataset of court judgments in the format that the API can understand. Processor 104 may need to convert the judgments into plain text or structured formats (e.g., JSON) to process them efficiently. This may include converting the dataset into machine encoded text as mentioned in greater detail herein below. Processor 104 may set up the API integration by following the documentation provided by the API provider. Typically, the processor 104 will need to obtain an API key and use it to make requests to the API. Processor 104 may use a natural language processing model to analyze the court judgments. The API should be able to extract relevant information such as the case details, parties involved, court decisions, legal reasoning, and any other structured data points. In some cases, the API may be configured to query for web applications to obtain judgment data 108. API may be further configured to filter through web applications according to a filter criterion.

In this disclosure, "filter criterion" are conditions the web applications must fulfill in order to qualify for API. Web applications may be filtered based off these filter criterion. Filter criterion may include, without limitation, web application dates, web application traffic, web application types, web applications addresses, and the like. API may also be configured to utilize a machine-learning model to select potential web applications, as explained below with reference to FIG. 2.

With continued reference to FIG. 1, judgment data 108 may include participant information. As used in the current disclosure, "participant information" is data regarding participants in past cases or judgments. Participant information contains information about the parties involved in the case, including the defendant(s), victim(s), and any other relevant individuals, such as witnesses or co-defendants. Participants may include judges, prosecutors, defense attorneys, witnesses, defendants, law enforcement officers, and the like. Participant information may include information demographic information regarding the participants. This may include the age, sex, race, ethnicity, education, employment, finances, residence, socioeconomic background, and the like.

With continued reference to FIG. 1, judgment data 108 may include judgment records. As used in the current disclosure, a "judgment record" refers to an official document of the proceedings of a court case or legal proceeding. A judgment record may be any document that contains information regarding the judgment data. Judgment records may include documents relating to the judgments or cases. This may include motions, deposition records, court transcripts, police reports, court records, judicial decisions, complaints, and the like. Judgment records may additionally include participant records. Participant records may include records involving participant demographics, human resource records, client files, invoices, timecards, driver's licenses, news articles, social media profiles and/or posts, and the like. Judgment records may be identified using a web crawler. Judgment records may include a variety of types of "notes" entered over time by the user, employees of the user, support staff, advisors, and the like. Judgment records may be converted into machine-encoded text using an optical character reader (OCR).

Still referring to FIG. 1, in some embodiments, optical character recognition or optical character reader (OCR) includes automatic conversion of images of written (e.g., typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases. a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, judgment data 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile judgment data 108. The web crawler may be seeded and/or trained with reputable websites, such as the judicial databases, governmental websites, news web sites, disciplinary body websites, court reporting websites, social media sites (i.e. LinkedIn, Facebook, TikTok, Instagram, and the like) to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract judgment records, inventory records, financial records, human resource records, past user profiles 108, sales records, user notes, and observations, based on criteria such as a time, location, and the like.

With continued reference to FIG. 1, processor 104 is configured to identify a plurality of correction data 112. As used in the current disclosure, "correction data" is data that unfairly or illegally affects or may affect the integrity of a criminal case. Correction data 112 may include data about a wrongful conviction 116 or a potential wrongful conviction 116. As used the current disclosure, a "wrongful conviction" is when an individual is unfairly or illegally found guilty of a crime. In such cases, an innocent person is wrongfully declared legally responsible for an offense, leading to their imprisonment or other punitive measures, even though they are not actually guilty of the crime. Wrongful convictions 116 are a tragic and distressing outcome of the criminal justice system and can have severe and lasting consequences for the wrongly convicted individual and their families. In an non-limiting example, correction data 112 may include an identification a case or group of cases where the defendant was wrongfully convicted. Correction data 112 may include information about unfair or illegal practices that have caused a defendant to be wrongfully convicted. These practices may involve evidentiary issues, discovery issues, prosecutorial misconduct, law enforcement misconduct, judicial misconduct, prosecutorial abuse of power, judicial abuse of power, new evidence, inadequate legal defenses, racial prejudice, gender bias, unfair practices, illegal practices, and the like. Correction data 112 may include information about a single case or a group of cases as represented by judgment data 108.

With continued reference to FIG. 1, correction data 112 may include data regarding one or more evidence gathering techniques. As used in the current disclosure, "evidence gathering techniques" are processes or methods that were used to gather evidence of a crime. In an embodiment, data describing evidence gathering techniques may include information regarding documentation, recordation, chain of custody, evaluation practices, and the like that were used to evaluate the evidence. In another embodiment, evidence gathering techniques may include an evaluation of quality or validity of forensic evidence. This evaluation of the forensic evidence may include an identification of unreliable or unproven forensic evidence that were used within a case. In a non-limiting example, this may include flagging forensic evidence that includes bite mark analysis because it has long history of being unreliable/unproven. Additional examples of unreliable forensic evidence that may be flagged may include phenotype analysis, hair analysis, fingerprint misidentification, ballistic analysis, shoeprint analysis, tire tread analysis, handwriting analysis, toolmark analysis, and the like. Analysis of forensic evidence may include evaluation/identification of untested forensic evidence or under tested forensic evidence. In a non-limiting example, if a piece of evidence was gathered and analyzed 20 years ago using dated techniques, processor 104 may identify this make suggestion to the user that the evidence be re-tested using modern techniques. In some cases, processor 104 may identify cases wherein the lab used to test the forensic evidence was known for unethical or fraudulent practice of falsifying research or analytical data without actually conducting experiments or tests. This may include an evaluation of the practices and protocols that the forensics lab underwent when analyzing the evidence. Evidence gathering techniques may additionally include an evaluation of the validity of confession evidence and eyewitness testimony. Processor 104 may identify situations wherein the confessions was likely coerced. This may be done by reviewing any tapes or recordings of the confession and the circumstances around the confessions. This may include situations where there was isolation or food/water deprivation. This may also include situations where that officer lied or made misrepresentations of the truth to the defendant. Processor 104 may evaluate the validity of eyewitness testimony by comparing the testimony of the eyewitness to other witnesses, videos, or audio.

With continued reference to FIG. 1, processor 104 may be configured to identify correction data 112 by identifying cases within the judgment data 108 wherein the procedural history identifies that a conviction was overturned. This may be done by sorting judgment data 108 according to cases wherein a judgment of "guilty" was later overturned by a court. This may be paired with and an element of impropriety 120 to identify correction data 112. In some cases, correction data may be generated as a function of the element of impropriety 120. As used in the current disclosure, an "element of impropriety" is one or more reasons or factors that indicate that the adjudication of a guilty verdict may be improper, illegal, or unfair. An element of impropriety 120 may include misconduct, wrong doing, abuse of power, gross negligence, discrimination, and the like on behalf of law enforcement, judges, investigators, prosecutors, defense attorneys, victims, and the like. In a non-limiting example, an element of impropriety 120 may include mistaken identity, false confessions, inadequate legal defenses, suppressed evidence, misconduct by authorities, false testimony, flawed forensic evidence, jury bias, and the like. In some embodiments, an element of impropriety 120 may include information regarding a participant in a past case such as, but not limited to a disbarred attorney or prosecutor, a judge that has been disciplined or impeached, and the like. In some embodiments, an element of impropriety 120 may include data that does not directly affect the integrity of judgment data 108, but casts doubt on it. For example, an element of impropriety 120 may include data regarding overturned convictions from within the same jurisdiction as a judgment from historical judgment data.

With continued reference to FIG. 1, processor 104 may be configured to identify an element of impropriety 120 as a function wrongful convictions 116. Processor 104 may analyze vast amounts of data related to the wrongful convictions 116, including evidence, witness statements, court transcripts, forensic reports, and any other relevant information to identify the element of impropriety 120. By applying data mining and natural language processing techniques, the processor 104 can identify patterns, inconsistencies, and potential errors in the case materials. Processor 104 may be configured to extract features from the data that represent the pertinent parts of each case. These features could include information about the participants (e.g., prosecutors, witnesses, defendants), case details (e.g., venue, evidence presented), and any specific indicators of impropriety (e.g., misconduct allegations, discriminatory behavior). Processor 104 then may label each case with a label indicative of the element of impropriety based on the identified improprieties. This labeled dataset may be used as training data for any machine learning model mentioned herein.

With continued reference to FIG. 1, processor 104 may generate an element of impropriety by finding commonalities between two or more cases as represented by the judgment data 108. Commonalities may include similar outcomes for the defendant, common participants, similar crimes, and the like. In some embodiments, processor 104 may be configured to analyze the charges brought against the defendants in each case and the evidence presented during the trials. Processor 104 may look for inconsistencies in the handling of evidence or discrepancies in how similar evidence was treated between cases. Processor 104 may be configured to identify the elements of impropriety by evaluating the quality and effectiveness of the legal representation for each case. The processor 104 may generate elements of impropriety 120 by identifying whether there were any differences in the resources allocated to the defense or whether any conflicts of interest existed. In some case processor 104 may provide a suggestion to the user to investigate if there were any signs of bias, either in the jury selection process or in the attitudes of key participants (e.g., judges, prosecutors, witnesses). The processor 104 may generate elements of impropriety 120 by examining whether plea deals were offered and accepted in any of the cases and whether the terms and conditions of those deals were consistent and fair. In an embodiment, processor 104 may compare the participants conduct during the cases ethical guidelines and professional standards, such as the professional rules of responsibility for a given jurisdiction.

With continued reference to FIG. 1, processor 104 may generate element of impropriety 120 using an impropriety classifier. As used in the current disclosure, an "impropriety classifier" is a classifier that is configured to generate element of impropriety 120. Impropriety classifier may be consistent with the classifier described below in FIG. 2. Inputs to the impropriety classifier may include judgment data 108, correction data 112, wrongful convictions 116, examples of element of impropriety 120, and the like. Outputs to the impropriety classifier may include an element of impropriety 120 tailored to the judgment data 108. Impropriety training data may include a plurality of data entries containing a plurality of inputs that are correlated to a plurality of outputs for training a processor by a machine-learning process. In an embodiment, impropriety training data may include a plurality of judgment data 108 correlated to examples of element of impropriety 120. In some cases, the impropriety classifier may be configured to compare the each case that is identified in the judgment data 108 to identify the elements of impropriety 120. The impropriety classifier may be configured to compare each case that is represented to in the judgment data 108 to known examples of elements of impropriety 120. In some cases, the impropriety classifier may be configured to compare each case that is represented to in the judgment data 108 to known ethical standards, such as the rules of professional responsibility or rules of professional conduct as provided by the jurisdiction and state, local, and federal law. Impropriety training data may be received from database 300. Impropriety training data may contain information about include judgment data 108, correction data 112, wrongful convictions 116, examples of element of impropriety 120, and the like. In an embodiment, impropriety training data may be iteratively updated as a function of the input and output results of past impropriety classifier or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, processor 104 may then suggest an reevaluations all or portions of evidence using advanced forensic analysis techniques as a function of the element of impropriety 120. In a non-limiting example, processor 104 may be configured to present the user with suggestion to retest the DNA within a rape kit with modern DNA analysis techniques. Reevaluations of physical evidence may include reevaluating video footage, DNA analysis, fingerprint analysis, facial recognition, and the like. In a non-limiting example, processor 104 may be configured to reevaluate the DNA testing or fingerprint analysis to determine if the evidence matches the convicted individual or if there were any procedural errors during the initial analysis. In an additional non-limiting example, if the defendant presented an alibi during the trial, processor 104 may cross-reference various data sources (e.g., surveillance footage, mobile phone records) to verify the accuracy of the alibi. Additionally, processor 104 may employ algorithms that can assist in analyzing eyewitness identification procedures and witness testimonies to assess the reliability of the identification process.

With continued reference to FIG. 1, processor 104 may be configured to generate one or more correction factors 124. As used in the current disclosure, a "correction factor" is an action that is indicative of unfair or illegal treatment which has negatively affected the outcome of a criminal cases. A correction factor 124 may be a pattern of actions that is spread across multiple cases that contributed to multiple wrongful convictions 116. Correction factors may include systemic issues or irregularities that have contributed to multiple wrongful convictions 116. A correction factor 124 may include a pattern of elements of impropriety 120 throughout multiple wrongful convictions 116. In a non-limiting example, a correction factor 124 may include prosecutorial misconduct, wherein the prosecutor has demonstrated a pattern of withholding evidence. In some cases the prosecutor may even negotiate plea deals based on the withheld evidence. In another non-limiting example, a correction factor 124 may include judicial abuse of power, wherein a judge demonstrated a pattern of giving a particular group of defendants excessive sentences. The process of identifying correction factors 124 may involve a comprehensive review of cases, considering evidence, witness testimonies, procedural errors, and any other relevant information that could have influenced the outcome of the cases. The cases with wrongful convictions are compared and correlated to identify common factors or actions that contributed to these negative outcomes. This is where the correction factors 124 starts to take shape as a pattern of actions that have consistently led to unfair results. In some cases, statistical methods may be employed to quantify the impact of the correction factor 124 on the overall prevalence of wrongful convictions 116. This may help in assessing the scale of the issue and its significance. Based on the findings from the review, analysis, and consultations, the processor 104 may formulate a comprehensive description of the correction factor 124. This may include details about the specific actions, their frequency, the affected cases, and the overall impact on the justice system.

With continued reference to FIG. 1, a correction factor 124 include a participant factor. As used in the current disclosure, a "participant factor" refers to an action or behavior exhibited by that participant, which is indicative of unfair, illegal, or improper conduct that has negatively affected the outcome of a criminal case. A participant may be a judge, prosecutor, law enforcement, defense lawyer, witnesses, or any other participant in the legal proceedings. A participant factor may be described as misconduct, abuse of power, discrimination, gross negligence, evidentiary issue, jury bias, conflicts of interest as exhibited by one or more participants. A non-limiting example of a participant factor may include instances of unethical or illegal behavior by a participant during the investigation or trial. For example, a prosecutor withholding exculpatory evidence, a law enforcement officer engaging in coercion or fabrication of evidence, or a defense attorney providing inadequate representation. Another non-limiting example of a participant factor may include participants in positions of authority or influence may abuse their power to manipulate the case in their favor. For instance, a judge showing bias or favoritism towards a particular side or using their authority to intimidate witnesses.

With continued reference to FIG. 1, a correction factor 124 include a venue factor. As used in the current disclosure, a "venue factor" as it relates to a venue refers to an element or set of circumstances within a specific location where a case is tried or heard that can lead to unfair or unjust outcomes in criminal cases. A venue, in this context, typically refers to the geographical location or jurisdiction where the trial or legal proceedings take place. A venue factor may involve various factors or conditions that might negatively impact the fairness and impartiality of the legal process, resulting in wrongful convictions or unjust outcomes. A non-limiting example of a venue factor may include a prevalent bias among the local population in the venue against certain groups or demographics, it could influence the composition and decision-making of the jury, leading to unfair judgments. Another non-limiting example of venue factors may include a lack of access to quality legal representation for defendants, leading to inadequate defense and unfair trial outcomes.

With continued reference to FIG. 1, a correction factor 124 include a group factor. As used in the current disclosure, a "group factor" refers to an action or pattern of behavior within the criminal justice system that results in unfair or biased treatment of defendants. based on their demographic characteristics. In this context, a demographic refers to specific characteristics of a defendant, such as race, ethnicity, gender, socioeconomic status, age, or other personal attributes that could influence the way they are treated during the legal process. A group factor may include groups of defendants that may be disproportionately affected by improprieties, leading to wrongful convictions or unjust outcomes. This can result from various factors, including biases or discrimination exhibited by law enforcement, prosecutors, jurors, or other participants in the criminal justice system. A non-limiting example of a group factor may include defendants with limited English proficiency or from different cultural backgrounds might encounter challenges in understanding their rights or communicating effectively during the legal process. Another non-limiting example of a group factor may include circumstances where defendants from specific racial or ethnic backgrounds are treated differently from others throughout the legal process. This could lead to biased investigations, unfair treatment in court, or discriminatory jury decisions.

With continued reference to FIG. 1, processor 104 may generate correction factor 124 classifying the plurality of wrongful convictions 116 into one or more correction categories. As used in the current disclosure, a "correction category" is a category that represents one or more elements of impropriety 120. Correction categories may include categories based on misconduct, wrong doing, abuse of power, gross negligence, discrimination, evidentiary issues, and the like categories related to participants, certain demographics, venues, and the like. In a non-limiting examples of correction categories may include prosecutorial misconduct, discrimination against a race, evidentiary issues in a given venue, jury bias, and the like. Processor 104 may generate the correction factor 124 by analyzing the classification results and reviewing the cases within each correction category. The processor may then identify patterns and insights about the prevalence and nature of improprieties can be uncovered. This analysis can help in understanding systemic issues and guide potential policy changes or further investigations.

With continued reference to FIG. 1, processor 104 may generate one or more correction factors 124 using a correction classifier 128. As used in the current disclosure, a "correction classifier" is a classifier that is configured to generate correction factors 124. Correction classifier 128 may be consistent with the classifier described below in FIG. 2. Inputs to the correction classifier 128 may include judgment data 108, correction data 112, wrongful convictions 116, elements of impropriety 120, and the like. As used in the current disclosure, "examples of correction factors" are historical correction factors that have been prior to the current versions of correction factors. Outputs to the correction classifier 128 may include examples of correction factors 124 tailored to the judgment data 108. Correction classifier 128 may be configured to generate correction factors 124 by classifying wrongful convictions 116 to into one or more correction categories. Correction training data may include a plurality of data entries containing a plurality of inputs that are correlated to a plurality of outputs for training a processor by a machine-learning process. In an embodiment, correction training data may include correction data 112 correlated to examples of correction factors 124. In another embodiment, correction training data may include wrongful convictions 116 correlated to one or more correction categories. Correction training data may be received from database 300. correction training data may contain information about judgment data 108, correction data 112, wrongful convictions 116, elements of impropriety 120, examples of correction factors 124, and the like. In an embodiment, correction training data may be iteratively updated as a function of the input and output results of past correction classifier 128 or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, machine learning plays a crucial role in enhancing the function of software for generating correction factors 124, specifically in identifying patterns of impropriety through multiple wrongful convictions. By analyzing vast amounts of data related to judicial data, machine learning algorithms can identify patterns, correlations, and dependencies that contribute to a pattern of impropriety in a venue, by participants, or against a given demographic. These algorithms can extract valuable insights from various sources, including communication logs, procedural history, evidentiary history, court transcripts, and shared documents. By applying machine learning techniques, the software can generate correction factors 124 that identifies patterns or impropriety within the judicial system. Machine learning models may enable the software to learn from past collaborative experiences of the entities and iteratively improve its training data over time. By leveraging historical data, the machine learning model can recognize patterns of unfair, unethical, or illegal treatment that have negative effects on the on the outcomes of criminal cases.

This iterative learning process empowers the software to continuously refine its understanding of the dynamics of the judicial system and generate more accurate and actionable set of correction factors 124.

With continued reference to FIG. 1, Processor 104 may be configured to update the training data of the correction classifier 128 using user inputs. A correction classifier 128 may use user input to update its training data, thereby improving its performance and accuracy. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, classifier may be trained using past inputs and outputs of classifier. In some embodiments, if user feedback indicates that an output of classifier was "bad," then that output and the corresponding input may be removed from training data used to train classifier, and/or may be replaced with a value entered by, e.g., another user that represents an ideal output given the input the classifier originally received, permitting use in retraining, and adding to training data; in either case, classifier may be retrained with modified training data as described in further detail below. In some embodiments, training data of classifier may include user feedback. The machine learning models may additionally be trained using the outcomes of new cases as they occur. This may include updating the training data as a function of new cases. In some embodiments, the training data may be iteratively updated as new case data is released to the public. In some cases, a user may update the training data using a specific subset of cases. For example cases from a given venue, associated with certain demographic groups, cases with certain participants, and the like.

With continued reference to FIG. 1, in some embodiments, an accuracy score may be calculated for classifier using user feedback. For the purposes of this disclosure, "accuracy score," is a numerical value concerning the accuracy of a machine-learning model. For example, the accuracy of a plurality of correction factors 124 may be averaged to determine an accuracy score. In some embodiments, an accuracy score may be determined for pairing of entities. For example, user feedback for a pairing of entities may be averaged together to determine the accuracy score for that particular group of correction factors 124 as applied to a group of wrongful convictions 116. Accuracy score or another score as described above may indicate a degree of retraining needed for a machine-learning model such as a classifier; processor 104 may perform a larger number of retraining cycles for a higher number (or lower number, depending on a numerical interpretation used), and/or may collect more training data for such retraining.

Still referring to FIG. 1, the processor may be configured to generate a machine-learning model, such as correction classifier 128, using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. processor 104 may then calculate a likelihood table by calculating probabilities of different data entries and classification labels. processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may identify a case group 132 as a function of the one or more correction factors 124. As used in the current disclosure, a "case group" is a group of cases that is susceptible to unfair, illegal, or immoral treatment. A case group 132 may include or more currently pending cases that have similarities to the wrongful convictions 116. To identify a case group 132 processor 104 may collect a diverse dataset that includes information about the wrongful convictions 116 and the identified correction factors 124. This dataset should also encompass details about currently pending or active cases that are still under investigation or trial. These cases may be sorted or organized by venue, participants, defendant demographics, and the like. The Processor 104 may then extract relevant features from the currently pending cases. These features may include case details (e.g., nature of the crime, location, date), participants' information (e.g., prosecutors, defendants, witnesses), and the specific correction factors present in each case. These features within the currently pending cases may be labeled based on traits that exhibit that are similar to the correction factors 124. These traits may include things like similar evidentiary issues, participants, case details, and the like. Processor 104 may then identify a case group from a group of cases by classifying a traits of theses to correction factors 124. In some cases, a processor 104 may apply clustering algorithms to a of group cases that have similarities in terms of their correction factors. Clustering algorithms automatically identify patterns and similarities within the data, grouping together cases that share common characteristics. One suitable clustering technique for this task is k-means, but there are various other algorithms that could be used depending on the data and its nature.

With continued reference to FIG. 1, processor 104 may identify a case group 132 using a case classifier. As used in the current disclosure, a "case classifier" is a classifier that is configured to identify a case group 132. Case classifiers may be consistent with the classifier described below in FIG. 2. Inputs to the case classifier may include judgment data 108, correction data 112, wrongful convictions 116, elements of impropriety 120, correction factors 124, a list of active cases, examples of case group 132, and the like. Outputs to the case classifier may include case group 132. Case training data may include a plurality of data entries containing a plurality of inputs that are correlated to a plurality of outputs for training a processor by a machine-learning process. In an embodiment, case training data may include a plurality of correction factors 124 correlated to examples of case groups 132. Case training data may be received from database 300. case training data may contain information about judgment data 108, correction data 112, wrongful convictions 116, elements of impropriety 120, correction factors 124, a list of active cases, examples of case group 132, and the like. In an embodiment, case training data may be iteratively updated as a function of the input and output results of past case classifier or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, Still referring to FIG. 1, processor 104 may be configured to generate a machine-learning model, such as a case classifier, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 is configured to determine a judgement score 136 as a function of the case group 132. As used in the current disclosure, "judgement score" is a score that describes the likelihood that a case or group of cases be negatively affected due to illegal, unfair, immoral, or illicit activities. Illegal, unfair, immoral, or illicit activities may be any activities as described by elements of impropriety 120. A processor 104 may generate judgement score 136 for each case of the plurality of cases that is a part of the case group 132. Alternatively, processor 104 may generate a judgment score 136 for the entire case group 132. Judgement score 136 may describe likelihood that a case or group of cases be negatively affected due to illegal, unfair, immoral, or illicit activities. Processor 104 may generate a judgment score 136 based on the frequency of the illicit acts as indicated by the correction factors 124 and the degree of similarities of the case group 132 to the cases represented by the correction factors 124. If the case group 132 is likely to include elements of impropriety 120 the judgement score 136 may be high, conversely if the case group 132 is unlikely to include elements of impropriety 120 the judgement score 136 may be low. Judgement score 136 may be expressed as a numerical score, alphanumeric score, a linguistic value. A non-limiting example, of a numerical scale, may include a scale from 1-10, 1-100, 1-1000, and the like. Examples of linguistic values may include, "High Chance of Wrongful Conviction," "Moderate Chance of Wrongful Conviction," "Low Chance of Wrongful Conviction," and the like. In some embodiments, a linguistic variable score range may be represented by a linguistic value. As used in the current disclosure, a "linguistic variable score range" is a range of scores that are associated with a linguistic value. For example, this may include a score of 0-2 representing "Low Chance of Wrongful Conviction" or a score of 8-10 representing "High Chance of Wrongful Conviction."

With continued reference to FIG. 1, a judgement score 136 may include an impropriety enumerator. As used in the current disclosure, an "impropriety enumerator" is a weighted score for each element of impropriety 120. Generating a weighted score for an element of impropriety 120 may involve assigning numerical values (weights) to different factors that contribute to the level of impropriety for that particular element. These weights represent the relative importance of each factor in determining the overall impropriety score. An impropriety enumerator may assign weights to each identified element of impropriety 120 based on its importance in influencing the level of impropriety. For example, prosecutorial misconduct may be weighted higher/ lower depending on the level of misconduct. The element of impropriety 120 may be normalized to them to ensure fair comparison and consistent interpretation. Scaling can involve converting factors into percentages, proportions, or standardized scores. The impropriety enumeration include evaluating each factor and rate them based on their degree of impropriety, following the scale and units determined in the previous steps. For example, you might rate factors on a scale from 1 to 10, where 1 represents minimal impropriety and 10 represents severe impropriety.

With continued reference to FIG. 1, a processor 104 may identify an impropriety enumerator using a lookup table. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in a static program storage, calculated as part of a program's initialization phase or even stored in hardware in application-specific platforms. Data within the lookup table may include previous examples of impropriety enumerators compared to elements of impropriety 120. Data within the lookup table may be received from database 300. Lookup tables may also be used to identify impropriety enumerators by matching an input value to an output value by matching the input against a list of valid (or invalid) items in an array. In a non-limiting example, elements of impropriety 120 may reflect that a venue has 3 judges who unfairly sentence people who belong to a given socioeconomic group. Examples of impropriety enumerators may indicate that jurisdictions with two judges who have exerted prejudice against a group have been assigned an impropriety enumerator 0.63 out of 1. A lookup table may look up the elements of impropriety 120 as an input and output a impropriety enumerator indicating the weight of the elements of impropriety. Processor 104 may be configured to "lookup" or input one or more growth judgment data 108, correction data 112, wrongful convictions 116, elements of impropriety 120, correction factors 124, a list of active cases, examples of case group 132, examples of judgment scores 136, and the like. Whereas the output of the lookup table may comprise impropriety enumerators. Data from the lookup table may be compared to examples of impropriety enumerators, for instance, and without limitation using string comparisons, numerical comparisons such as subtraction operations, or the like. Alternatively or additionally, a query representing elements of elements of impropriety 120 may be submitted to the lookup table and/or a database, and an associated impropriety enumerators stored in a data record within the lookup table and/or database may be retrieved using the query.

With continued reference to FIG. 1, processor 104 may generate the judgement score 136 using a score machine-learning model. As used in the current disclosure, a "score machine-learning model" is a machine-learning model that is configured to generate a judgement score 136. Score machine-learning model may be consistent with the machine-learning model described below in FIG. 2. Inputs to the score machine-learning model may include judgment data 108, correction data 112, wrongful convictions 116, elements of impropriety 120, correction factors 124, a list of active cases, examples of case group 132, examples of judgment scores 136, and the like. Outputs to the score machine-learning model may include a judgement score 136 tailored to the each case group 132. Score training data is a plurality of data entries containing a plurality of inputs that are correlated to a plurality of outputs for training a processor by a machine-learning process. In an embodiment, score training data may include a plurality of case groups 132 correlated to examples of collaboration scores 144. Score training data may be received from database 300. Score training data may contain information regarding judgment data 108, correction data 112, wrongful convictions 116, elements of impropriety 120, correction factors 124, a list of active cases, case groups 132, examples of judgment scores 136. In an embodiment, a score machine-learning model may be iteratively updated with the input and output results of past score machine-learning models. Machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning models, learning vector quantization, and/or neural network-based machine-learning models.

With continued reference to FIG. 1, machine-learning models disclosed herein may be iteratively updated with new information as a it becomes available to the public. In an embodiment, the score machine learning model may be up dated as new cases are adjudicated which produce new judgment data 108. This new judgment data 108 may modify the case groups 132 as they were previously presented. Once the cases with including additional elements of impropriety 120 are preprocessed, processor 104 may use it to update the score machine-learning models. In embodiment, processor 104 may combine the existing training data with the new data and retrain the model from scratch. This approach is suitable for some machine learning algorithms like decision trees or k-nearest neighbors. In other embodiments, particularly neural networks, and deep learning models, can be updated incrementally without retraining the entire model. By applying gradient descent with the new data in multiple iterations, the model can be updated to reflect the new information. During the update, the processor 104 may employ techniques like regularization to prevent overfitting to the new data. Adjusting the learning rate can also help control the magnitude of changes applied to the model during incremental updates. Notifications can have different levels of importance, ranging from critical alerts that require immediate attention to less urgent information or updates.

Still referring to FIG. 1, processor 104 may be configured to display a judgement score 136 using a display device 140. As used in the current disclosure, a "display device" is a device that is used to display a plurality of data and other digital content. A display device 140 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

With continued reference to FIG. 1, processor 104 may be configured to generate a notification as a function of the judgement score 136 being above a judgment threshold. As used in the current disclosure, a "judgment threshold" is a predetermined value or boundary used to make decisions based on the output of the judgement score 136. Once the judgment scores 136 are calculated for a case group 132, a threshold value may be established. This value acts as the dividing line between cases considered to have a high likelihood of being negatively affected by illegal, unfair, immoral, or illicit activities and those deemed to have a lower risk. Cases with judgment scores 136 above the threshold are classified as potentially problematic or high-risk cases, warranting further investigation or attention. Conversely, cases with judgment scores below the threshold are considered to have a lower risk of being negatively impacted by impropriety. A processor 104 may generate a notification as a function of the judgement score 136 being above a judgment threshold. As used in the current disclosure, a "notification" is a message or alert that informs a user or recipient about a specific event, update, or action within an application, system, or platform. Notifications can be displayed on various devices, such as smartphones, computers, smartwatches, tablets, or web browsers, depending on the platform where they are generated. A notification may be provided to a user, advocacy groups, news organizations, public officials, governmental officials, and the like. Notifications may include emails, text messages, push notifications, web notifications and the like. Notifications may provide the users with all of the information that has been interpolated by apparatus 100. This may include the judgment score 136, case group 132, elements of impropriety 120 and the like.

Figure 2:
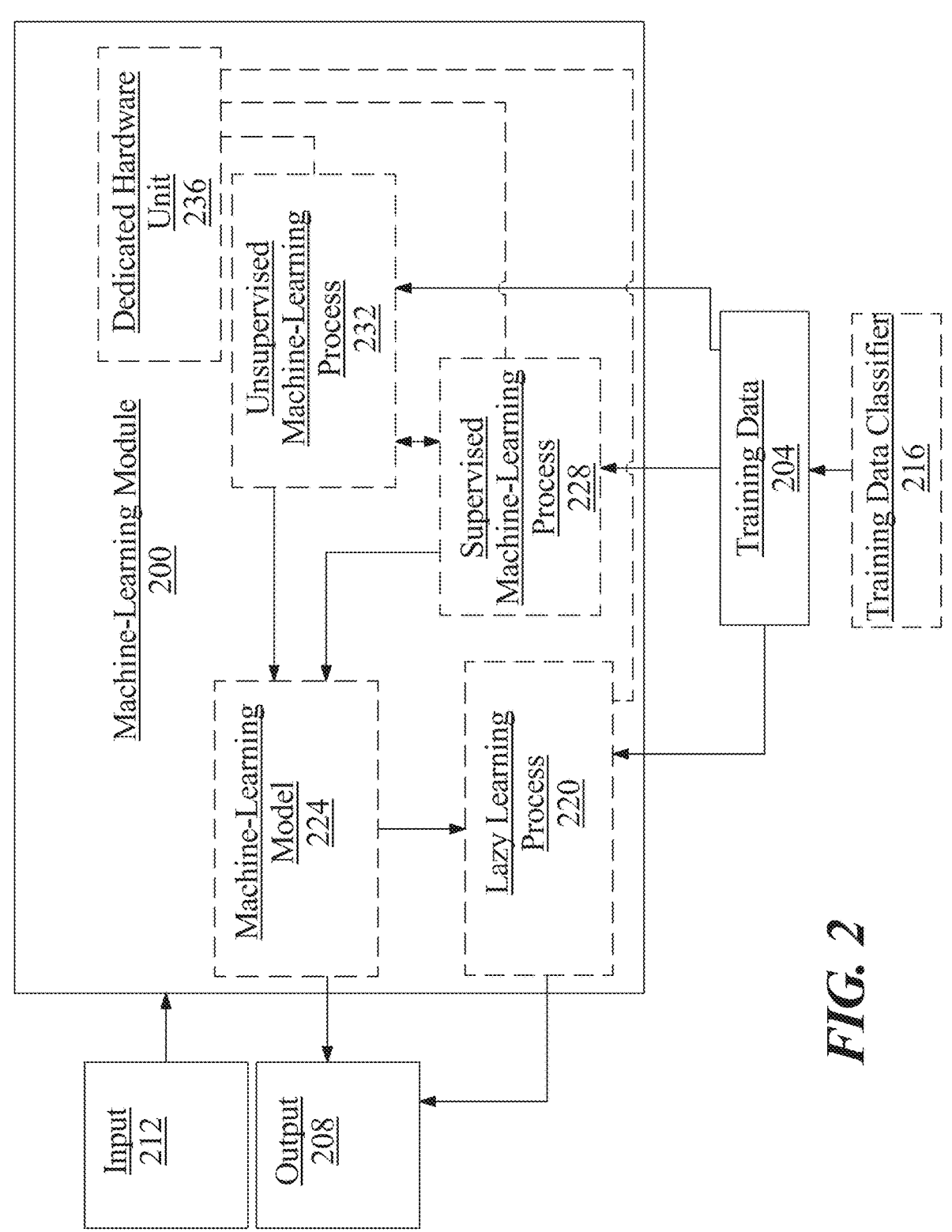
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data

204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example wrongful convictions 116 correlated to one or more correction categories.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a processes whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to according to venue, participant, defendant demographics, and the like.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identified as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units. In some embodiments computing device, processor and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include elements of impropriety 124 and wrongful convictions 116 as described above as inputs, correction factors 124 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/ or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
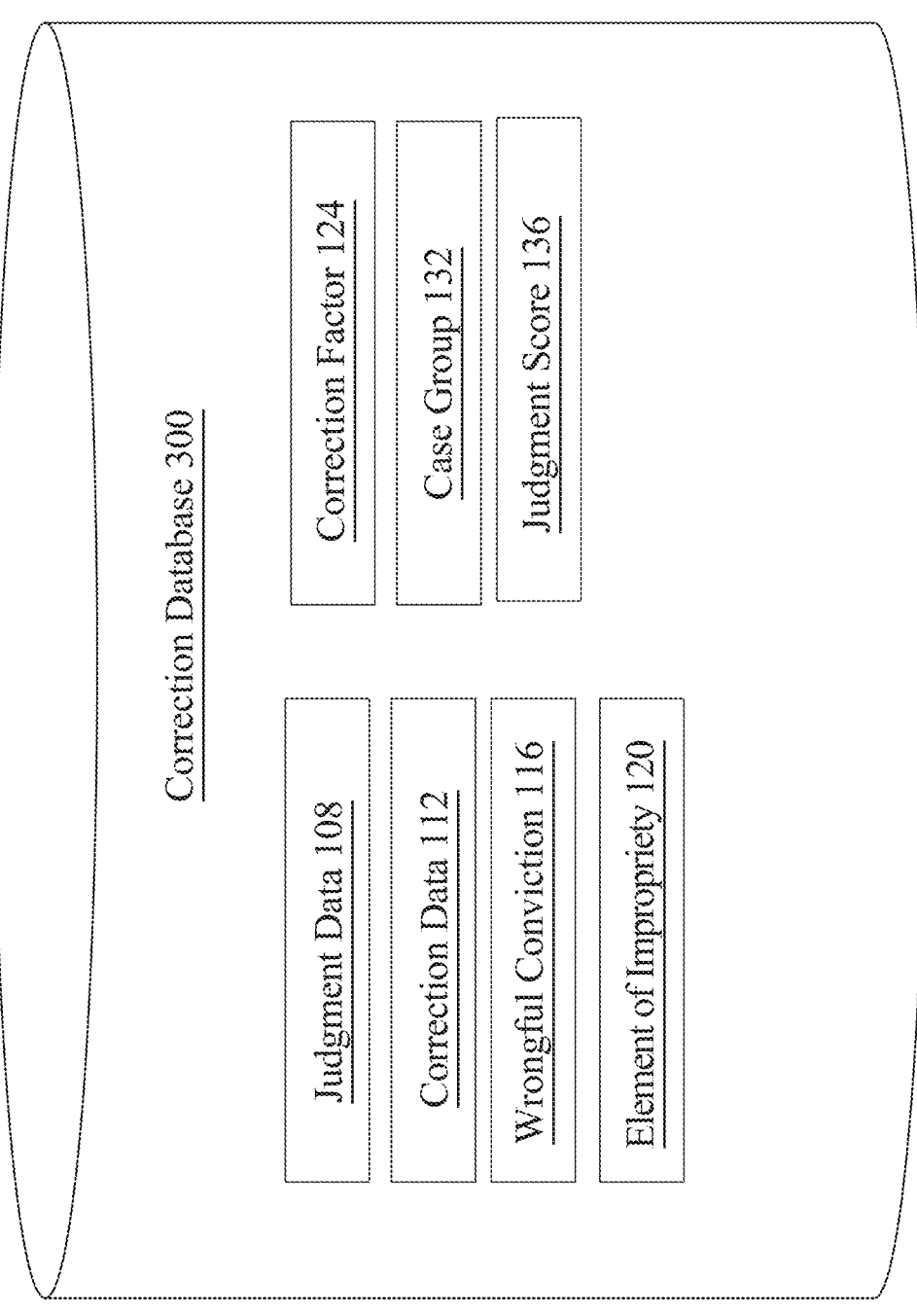
FIG. 3 is a block diagram of an exemplary embodiment of a correction database.

Now referring to FIG. 3, an exemplary correction database 300 is illustrated by way of block diagram. In an embodiment, any past or present versions of any data disclosed herein may be stored within the correction database 300 including but not limited to: judgment data 108, correction data 112, wrongful convictions 116, elements of impropriety 120, correction factors 124, a list of active cases, case group 132, judgment scores 136, and the like. Processor 104 may be communicatively connected with correction database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. Correction database 300 may be implemented, without limitation, as a relational database, a key-value retrieval database such as a NOSQL database, or any other format or structure for use as a database that a person skilled in the art would recognize as suitable upon review of the entirety of this disclosure. Correction database 300 may alternatively or additionally be implemented using a distributed data storage protocol and/or data structure, such as a distributed hash table or the like. Correction database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
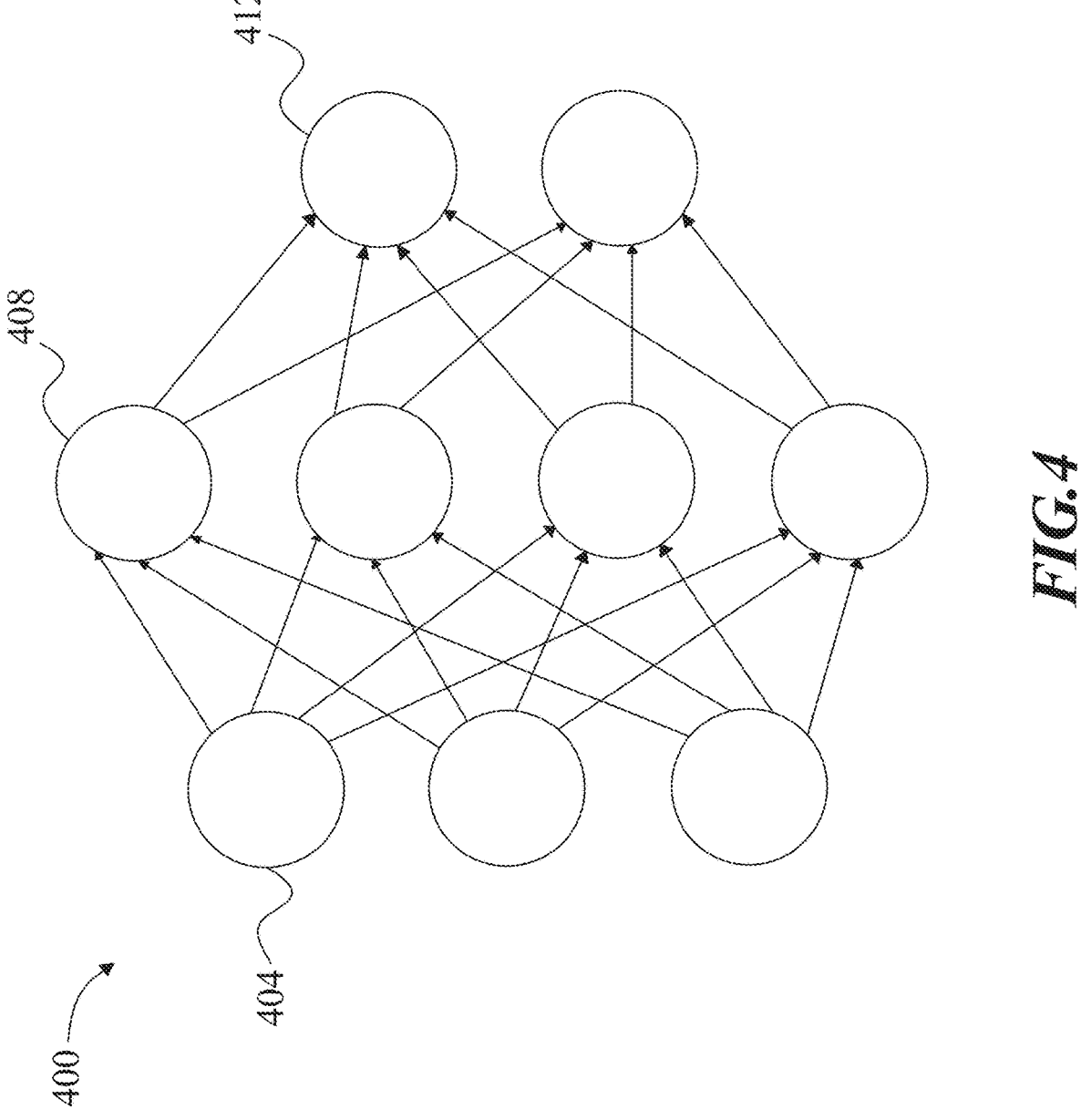
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
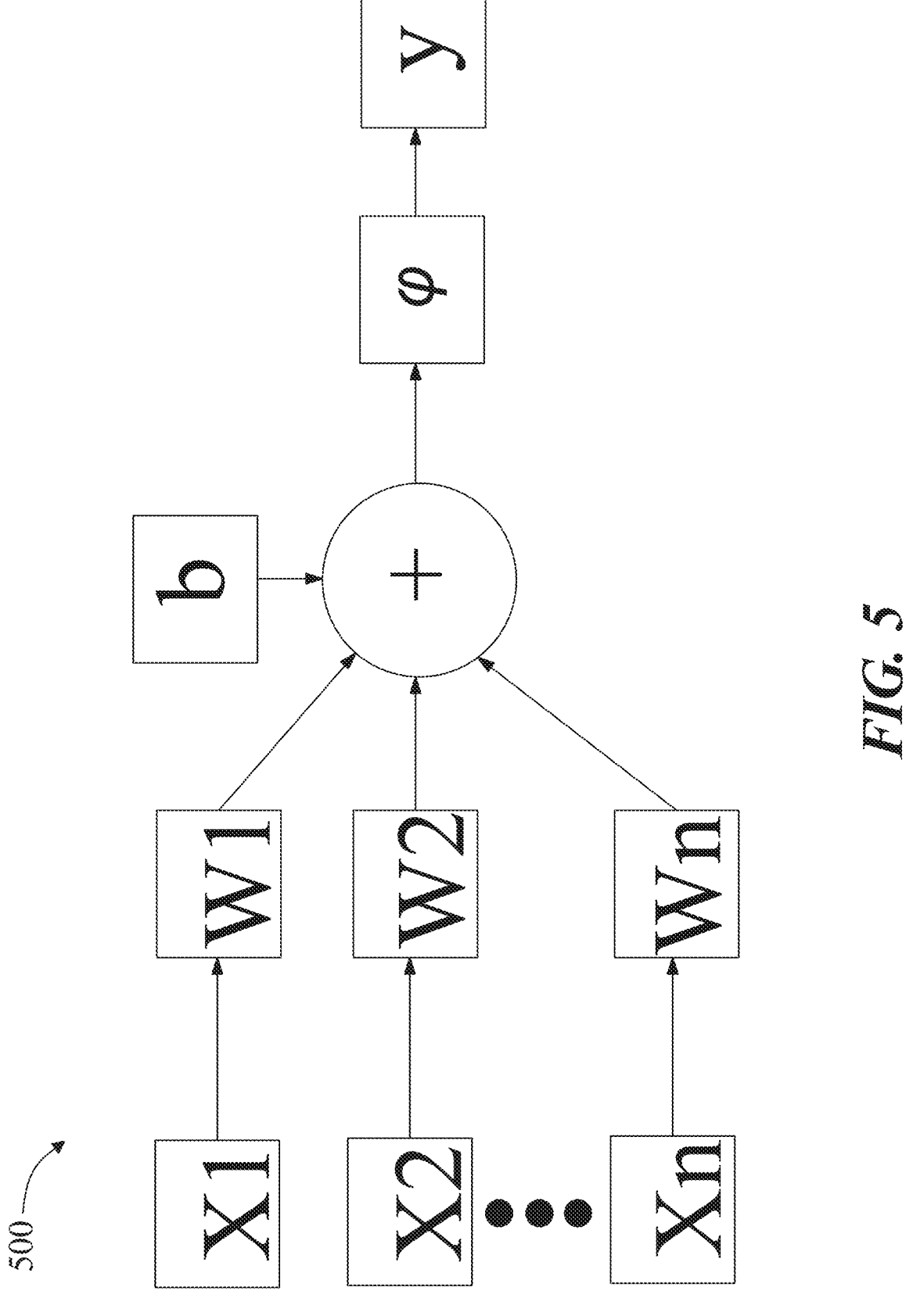
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_1$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
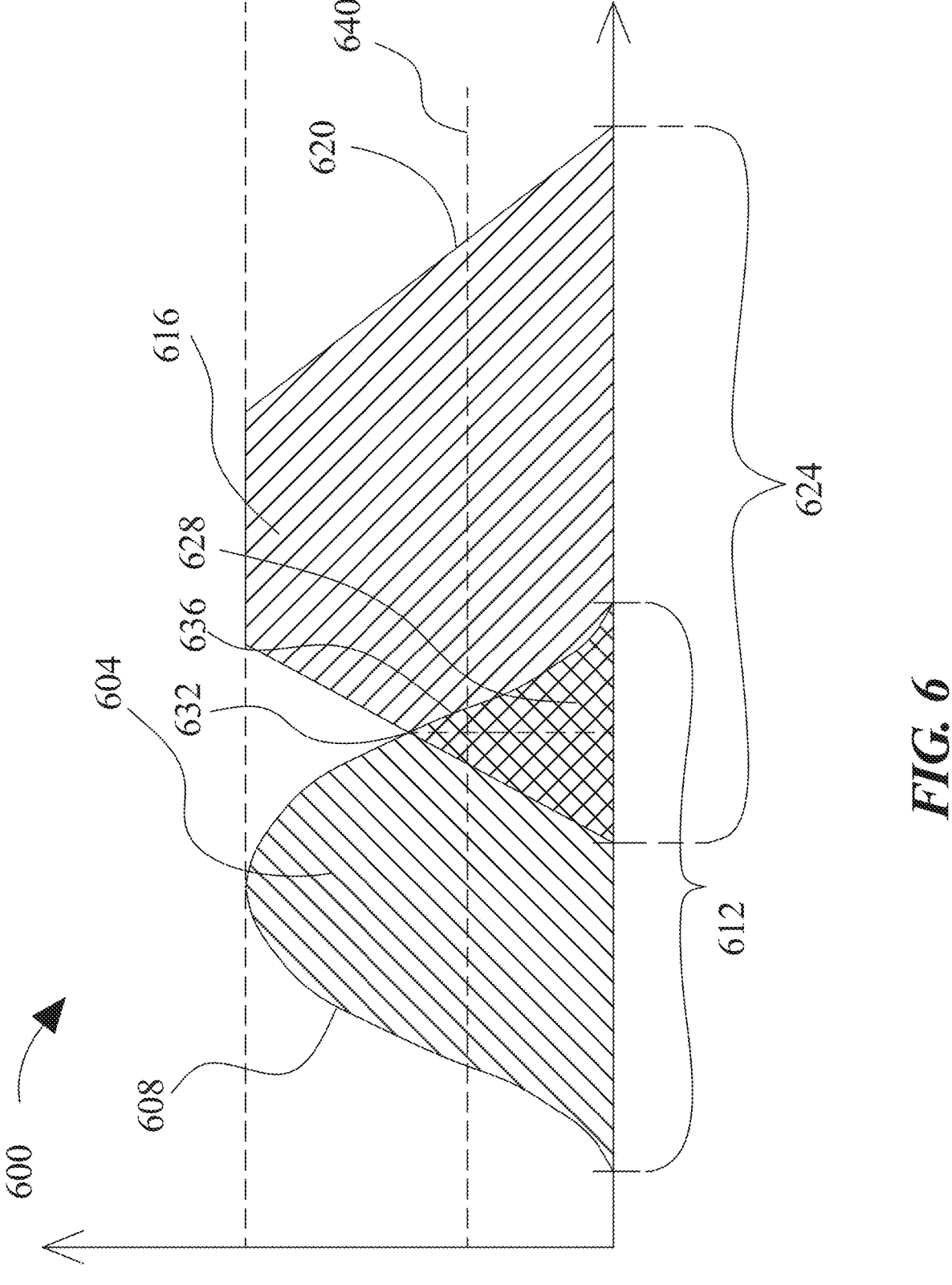
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting embodiment, the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent a list of active cases and correction factors 124 from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input a list of active cases and correction factors 124. For instance, an acceptance variable may represent a first measurable value pertaining to the classification of a list of active cases to correction factors 124. Continuing the example, an output variable may represent a case group 132. In an embodiment, a list of active cases and/or correction factors 124 may be represented by their own fuzzy set. In other embodiments, a case group 132 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max (a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$(x, a, b, c) = \begin{cases} 0, \text{ for } x > c \text{ and } x < a \\ \dfrac{x-a}{b-a}, \text{ for } a \leq x < b \\ \dfrac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any a list of active cases and correction factors 124. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, a case group 132 may indicate a sufficient degree of overlap with fuzzy set representing a list of active cases and correction factors 124 for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both a list of active cases and correction factors 124 have fuzzy sets, a case group 132 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Referring now to FIG. 7, a flow diagram of an exemplary method 700 for the generation of a judgment score is illustrated. At step 705, method 700 includes receiving, using at least a processor, a plurality of judgment data from a user. This may be implemented as described and with reference to FIGS. 1-7. In an embodiment, receiving a plurality of judgment data may include converting a judgement record in to machine encoded text using an optical character reader.

Still referring to FIG. 7, At step 710, method 700 includes identifying, using the at least a processor, a plurality of correction data as a function of the plurality of judgment data. This may be implemented as described and with reference to FIGS. 1-7. In an embodiment, identifying the plurality of correction data may include identifying one or more wrongful convictions as a function of the judgment data. In another embodiment, identifying the plurality of correction data may further include determining elements of impropriety as a function of the one or more wrongful convictions and identifying the plurality of correction data as a function of the one or more wrongful convictions and the element of impropriety.

Still referring to FIG. 7 At step 715, method 700 includes generating, using the at least a processor, one or more correction factors as a function of the plurality of correction data. This may be implemented as described and with reference to FIGS. 1-7. In an embodiment, the one or more correction factors may include participant factors, venue factors, and/or group factors. In another embodiment, generating the one or more correction factors may include generating the one or more correction factors as a function of a classification of one or more wrongful convictions into one or more correction categories. In some cases this may include training a correction classifier using correction training data, wherein the correction training data includes the one or more wrongful convictions correlated to the historical one or more correction categories and generating the one or more correction factors as a function of the plurality of correction data using a trained correction classifier.

Still referring to FIG. 7 At step 720, method 700 includes identifying, using the at least a processor, a case group as a function of the one or more correction factors. This may be implemented as described and with reference to FIGS. 1-7.

In an embodiment, identifying a case group may include classifying one or more traits of a case to the one or more correction factors.

Still referring to FIG. 7 At step 725, method 700 includes generating, using the at least a processor, a judgment score as a function of the case group. This may be implemented as described and with reference to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
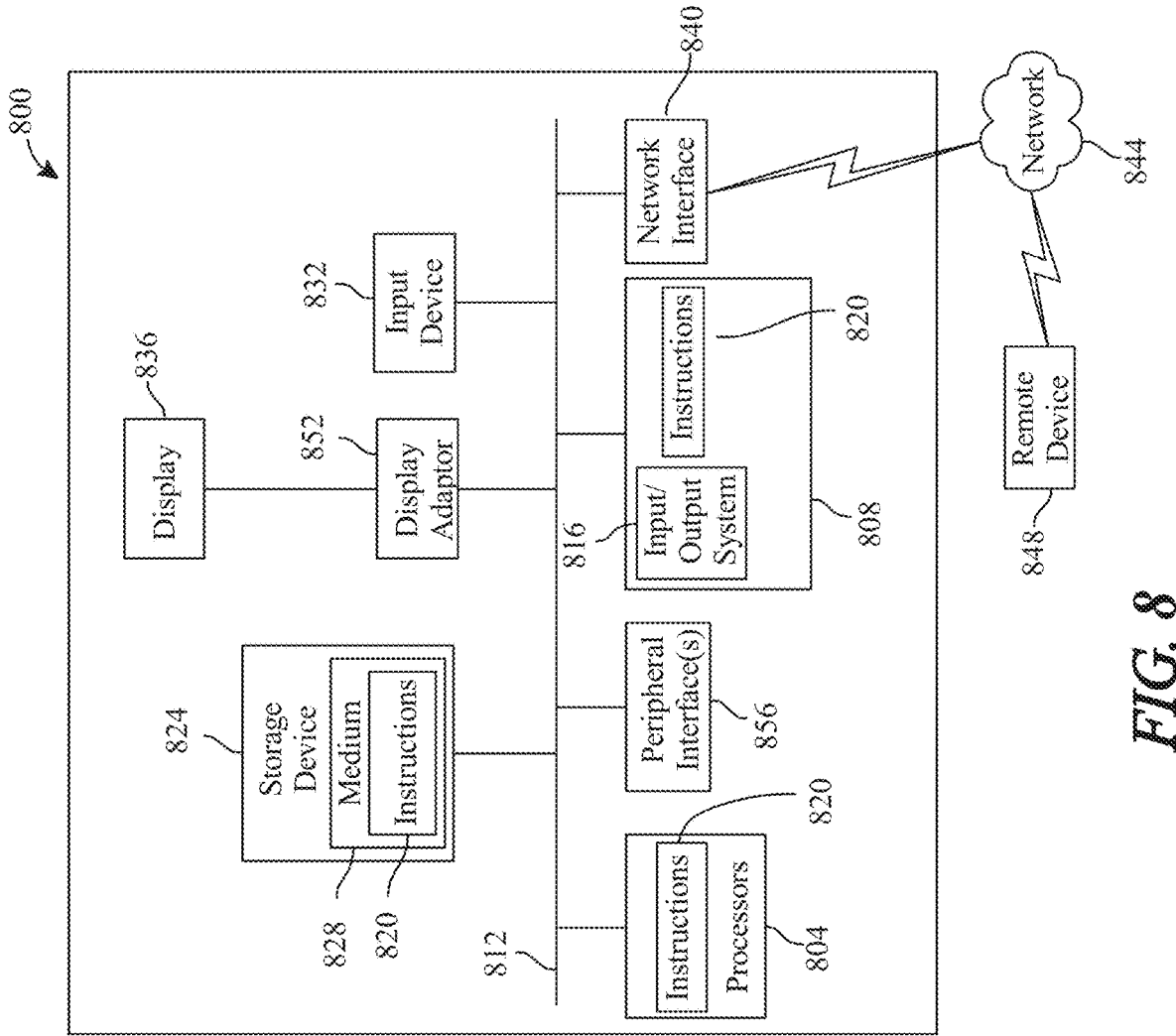
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for the generation of a judgment score, wherein the apparatus comprises:
  at least a processor; and
  a memory communicatively connected to the at least a processor, wherein the memory contains instructions configuring the at least a processor to:
    generate a plurality of judgment data using a web crawler configured to generate a web query to search for at least a judgment record based on a time criteria and wherein an optical character recognition (OCR) is used to convert at least a portion of the plurality of judgment data into machine-encoded text, wherein converting the at least a portion of the plurality of judgment data into the machine-encoded text comprises converting images of text in the at least a portion of the plurality of judgment data into the machine-encoded text and further comprises:
      pre-processing the images of text by de-skewing at least one image component associated with the plurality of judgment data by applying a transform operation to the image components; and
      implementing an OCR algorithm comprising a matrix matching process by comparing pixels of the pre-processed images to pixels of a stored glyph on a pixel-by-pixel basis;
    identify a plurality of correction data as a function of the OCR-processed plurality of judgment data;
    generate one or more correction factors as a function of the plurality of correction data using a machine learning model comprising a correction classifier and further comprising:
      receiving correction training data, wherein the correction training data comprises an input layer of nodes comprising a plurality of wrongful convictions, one or more intermediate layers of nodes, and an output layer of nodes comprising a plurality of correction data;
      training, iteratively, the correction classifier using the correction training data, wherein training the correction classifier comprises:
        assigning weighted values to nodes in adjacent layers of the correction training data; and
        adjusting connections and the weighted values between the nodes in adjacent layers of the correction training data to produce a desired output based on at least user inputs indicating a sub-optimal performance received by the at least processor by performing an auditing process configured to compare outputs of the correction classifier to a convergence test to reconfigure a network of nodes; and
      generating the one or more correction factors as a function of the plurality of correction data using the trained correction classifier;
    wherein the at least a processor is further configured to:
    upsample the correction training data, using at least one of: a set of interpolation rules in order to predict interpolated data associated with the correction training data; a sample expander method for adding expander data associated with the correction training data; and a filter for filtering the correction training data in accordance with a frequency;
    downsample, using a compressor, the correction training data by removing an nth entry in a sequence of correction training data;
    identify a case group as a function of the one or more correction factors; and
    generate a judgment score as a function of the case group.

2. The apparatus of claim 1, wherein the one or more correction factors comprises participant factors.

3. The apparatus of claim 1, wherein the one or more correction factors comprises venue factors.

4. The apparatus of claim 1, wherein the one or more correction factors comprises group factors.

5. The apparatus of claim 1, wherein identifying the plurality of correction data comprises identifying one or more wrongful convictions as a function of the judgment data.

6. The apparatus of claim 1, wherein identifying the plurality of correction data further comprises:
  determining an element of impropriety as a function of the plurality of judgment data; and
  identifying the plurality of correction data as a function of the element of impropriety.

7. The apparatus of claim 1, wherein generating the one or more correction factors comprises generating the one or more correction factors as a function of a classification of one or more wrongful convictions into one or more correction categories.

8. The apparatus of claim 1, wherein identifying the case group comprises classifying one or more traits of a case to the one or more correction factors.

9. A method for the generation of a judgment score, wherein the method comprises:
  generating, using at least a processor, a plurality of judgment data using a web crawler configured to generate a web query to search for at least a judgment record based on a time criteria and wherein an optical character recognition (OCR) is used to convert at least a portion of the plurality of judgment data into machine-encoded text, wherein converting the at least a portion of the plurality of judgment data into the machine-encoded text comprises converting images of text in the at least a portion of the plurality of judgment data into the machine-encoded text and further comprises:
    pre-processing the images of text by de-skewing at least one image component associated with the plurality of judgment data by applying a transform operation to the image components; and
  implementing an OCR algorithm comprising a matrix matching process by comparing pixels of the pre-processed images to pixels of a stored glyph on a pixel-by-pixel basis;

identifying, using the at least a processor, a plurality of correction data as a function of the plurality of judgment data;

generating, using the at least a processor, one or more correction factors as a function of the plurality of correction data using a machine learning model comprising a correction classifier and further comprising:

receiving correction training data, wherein the correction training data comprises an input layer of nodes comprising a plurality of wrongful convictions, one or more intermediate layers of nodes, and an output layer of nodes comprising a plurality of correction data;

training, iteratively, the correction classifier using the correction training data, wherein training the correction classifier comprises:

assigning weighted values to nodes in adjacent layers of the correction training data; and adjusting connections and the weighted values between the nodes in adjacent layers of the correction training data to produce a desired output based on at least user inputs indicating a sub-optimal performance received by the at least processor by performing an auditing process configured to compare outputs of the correction classifier to a convergence test to reconfigure a network of nodes; and generating the one or more correction factors as a function of the plurality of correction data using the trained correction classifier;

upsampling the correction training data, using at least one of: a set of interpolation rules in order to predict interpolated data associated with the correction training data; a sample expander method for adding expander data associated with the correction training data; and a filter for filtering the correction training data in accordance with a frequency;

downsampling, using a compressor, the correction training data by removing an nth entry in a sequence of correction training data;

identifying, using the at least a processor, a case group as a function of the one or more correction factors; and generating, using the at least a processor, a judgment score as a function of the case group.

10. The method of claim 9, wherein the one or more correction factors comprises participant factors.

11. The method of claim 9, wherein the one or more correction factors comprises venue factors.

12. The method of claim 9, wherein the one or more correction factors comprises group factors.

13. The method of claim 9, wherein identifying the plurality of correction data comprises identifying one or more wrongful convictions as a function of the judgment data.

14. The method of claim 9, wherein identifying the plurality of correction data further comprises:

determining an element of impropriety as a function of the plurality of judgment data; and identifying the plurality of correction data as a function of the element of impropriety.

15. The method of claim 9, wherein generating the one or more correction factors comprises generating the one or more correction factors as a function of a classification of one or more wrongful convictions into one or more correction categories.

16. The method of claim 9, wherein identifying the case group comprises classifying one or more traits of a case to the one or more correction factors.

17. The apparatus of claim 1, further comprising at least one of: an anti-aliasing filter; an anti-imaging filter and a low-pass filter configured to clean an output associated with the compressor.

18. The method of claim 9, further comprising cleaning, by least one of: an anti-aliasing filter; an anti-imaging filter and a low-pass filter, an output associated with the compressor.

* * * * *